(12) United States Patent
Kuroda

(10) Patent No.: US 12,316,193 B2
(45) Date of Patent: *May 27, 2025

(54) ROTARY APPARATUS, ATTACHING STRUCTURE OF ROTARY APPARATUS, AND CONNECTING STRUCTURE OF ROTARY APPARATUS AND EXTERNAL CONNECTOR

(71) Applicant: MINEBEA MITSUMI Inc., Nagano (JP)

(72) Inventor: Minoru Kuroda, Nagano (JP)

(73) Assignee: MINEBEA MITSUMI Inc., Nagano (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/465,254

(22) Filed: Sep. 12, 2023

(65) Prior Publication Data

US 2023/0421019 A1    Dec. 28, 2023

Related U.S. Application Data

(63) Continuation of application No. 16/977,887, filed as application No. PCT/JP2019/005771 on Feb. 18, 2019, now Pat. No. 11,764,640.

(30) Foreign Application Priority Data

Mar. 8, 2018 (JP) ................................ 2018-042347

(51) Int. Cl.
*H02K 5/22* (2006.01)
(52) U.S. Cl.
CPC .................................... *H02K 5/225* (2013.01)
(58) Field of Classification Search
CPC .............................. H02K 5/22; H02K 5/225
See application file for complete search history.

(56) References Cited

U.S. PATENT DOCUMENTS 6,107,713 A     8/2000  Hulsmann
11,764,640 B2*  9/2023  Kuroda ................. H02K 5/08
                                            310/71

(Continued)

FOREIGN PATENT DOCUMENTS

CN      202957700 U    5/2013
CN      105594104 A    5/2016

(Continued)

OTHER PUBLICATIONS

International Search Report for corresponding International Application No. PCT/JP2019/005771 mailed May 7, 2019.

(Continued)

*Primary Examiner* — Eric Johnson
(74) *Attorney, Agent, or Firm* — Chrisman Gallo Tochtrop LLC

(57) ABSTRACT

To provide a rotary apparatus able to facilitate assembly of the rotary apparatus, and an attaching structure of the rotary apparatus. A rotary apparatus (1) includes a motor (10) having motor terminals (13), terminal members (21) and (22), a first housing (60), the terminal members (21) and (22) being attached to the first housing (60), and a second housing (40) having an accommodating part configured to accommodate the motor (10), the first housing (60) being attached to the second housing (40). The first housing (60) is attachable to or separable from the second housing (40) in a predetermined direction. The terminal members (21) and (22) are electrically connected to the motor terminals (13). The terminal members (21) and (22) have externally-connected terminal portions (33) and (34) to be connected to an external unit. The predetermined direction is a longitudinal direction of the externally-connected terminal portions (33) and (34).

9 Claims, 12 Drawing Sheets

(56) References Cited

U.S. PATENT DOCUMENTS

| | | | |
|---|---|---|---|
| 2008/0284272 A1 | 11/2008 | Honda et al. | |
| 2009/0010787 A1 | 1/2009 | Nakazawa et al. | |
| 2013/0196545 A1 | 8/2013 | Adachi et al. | |
| 2016/0268736 A1 | 9/2016 | Goto et al. | |
| 2017/0250589 A1 | 8/2017 | Nakamura et al. | |
| 2018/0026497 A1 | 1/2018 | Yamamoto et al. | |

FOREIGN PATENT DOCUMENTS

| | | | |
|---|---|---|---|
| CN | 107112863 | A | 8/2017 |
| EP | 0 655 822 | A1 | 5/1995 |
| EP | 2 624 366 | A1 | 8/2013 |
| JP | 07-194052 | A | 7/1995 |
| JP | 10-225048 | A | 8/1998 |
| JP | 2008-312435 | A | 12/2008 |
| JP | 2014-136522 | A | 7/2014 |
| JP | 2017-158223 | A | 9/2017 |
| WO | 2018/054779 | A1 | 3/2018 |

OTHER PUBLICATIONS

Written Opinion for corresponding International Application No. PCT/JP2019/005771 dated May 7, 2019 and English translation.
International Preliminary Report on Patentability for corresponding International Application No. PCT/JP2019/005771 dated Sep. 8, 2020.
Notice of Reasons for Refusal dated Feb. 1, 2022 for corresponding Japanese Application No. 2018-042347 and English translation.
First Office Action dated Aug. 2, 2022 for corresponding Chinese Application No. 201980017265.3 and English translation.
Second Office Action dated Feb. 16, 2023 for corresponding Chinese Application No. 201980017265.3 and English translation.

* cited by examiner

ROTARY APPARATUS, ATTACHING STRUCTURE OF ROTARY APPARATUS, AND CONNECTING STRUCTURE OF ROTARY APPARATUS AND EXTERNAL CONNECTOR

CROSS-REFERENCE TO RELATED APPLICATIONS

This application is a Continuation of U.S. application Ser. No. 16/977,887 filed on 2020 Sep. 3, which was a national stage entry of PCT/JP2019/005771, filed on 2019 Feb. 18, that claims the benefit of Japanese Application No. 2018-042347, filed 2018 Mar. 8, the entire disclosures of which are hereby incorporated herein by reference.

TECHNICAL FIELD

The present invention relates to a rotary apparatus, an attaching structure of the rotary apparatus, and a connecting structure of the rotary apparatus and an external connector, and particularly relates to a rotary apparatus having a motor and a terminal member configured to supply a current to the motor, an attaching structure of the rotary apparatus, and a connecting structure of the rotary apparatus and an external connector.

BACKGROUND ART

A rotary apparatus has been conventionally used, in which a motor and a terminal member configured to supply a current to the motor are attached to a housing. The rotary apparatus as described above is attached to an attached portion, so that a driving force of the motor can be used in the attached portion.

Patent Literature 1 listed below discloses a small-sized motor with a speed reducer. In this motor, a feed line, through which a current flows and is supplied to the motor, is of the connector connection type in which a connection portion of the feed line is connected to an electrical input unit of the motor by using a connector.

DOCUMENT LIST

Patent Literature

Patent Literature 1: Japanese Patent Application Publication No. 1998-225048

SUMMARY OF INVENTION

Technical Problem

It is an object of the present invention to provide a rotary apparatus able to facilitate assembly of the rotary apparatus, an attaching structure of the rotary apparatus, and a connecting structure of the rotary apparatus and an external connector.

Solution to Problem

To achieve the above object, according to an aspect of the present invention, a rotary apparatus includes: a motor including a motor terminal; a terminal member; a first housing, the terminal member being attached to the first housing; and a second housing including an accommodating part configured to accommodate the motor, the first housing being attached to the second housing, wherein the first housing is attachable to or separable from the second housing in a predetermined direction, the terminal member is electrically connected to the motor terminal, the terminal member includes an externally-connected terminal portion to be connected to an external unit, and the predetermined direction is a longitudinal direction of the externally-connected terminal portion.

Preferably, a rotation axis direction of the motor is different from the predetermined direction, the accommodating part includes an opening portion in the rotation axis direction of the motor, and the first housing closes the opening portion.

Preferably, the terminal member is accommodated in the first housing and the second housing.

Preferably, the motor includes a frame, and the motor terminal protrudes from the frame of the motor in a direction different from the predetermined direction.

Preferably, the first housing includes a groove portion formed in the predetermined direction, the terminal member includes a motor-connected terminal portion positioned inside the groove portion, and the motor terminal contacts the motor-connected terminal portion inside the groove portion.

Preferably, the motor terminal includes a surface extending in the predetermined direction.

Preferably, the first housing is fitted into the second housing.

Preferably, the rotary apparatus includes a connector portion, wherein the connector portion includes the externally-connected terminal portion and a connector housing portion provided at the second housing, and the connector housing portion includes a hole portion, the externally-connected terminal portion being insertable into the hole portion in the predetermined direction.

Preferably, an end portion of the second housing includes an attaching surface in the rotation axis direction of the motor, and the attaching surface is provided with a fit portion capable of fitting into an attached portion.

According to another aspect of the present invention, an attaching structure of a rotary apparatus includes: the rotary apparatus described above; and an attached portion attached to an attaching surface of the rotary apparatus, wherein a fit portion of the rotary apparatus fits into a fitted portion formed in the attached portion.

According to a further aspect of the present invention, in a connecting structure of the rotary apparatus described above and an external connector, an external connector is connected to the connector portion.

According to these aspects of the present invention, a rotary apparatus able to facilitate assembly of the rotary apparatus, an attaching structure of the rotary apparatus, and a connecting structure of the rotary apparatus and an external connector can be provided.

DESCRIPTION OF EMBODIMENTS

Hereinafter, a rotary apparatus according to an embodiment of the present invention and a device using the rotary apparatus will be described.

Figure 1:
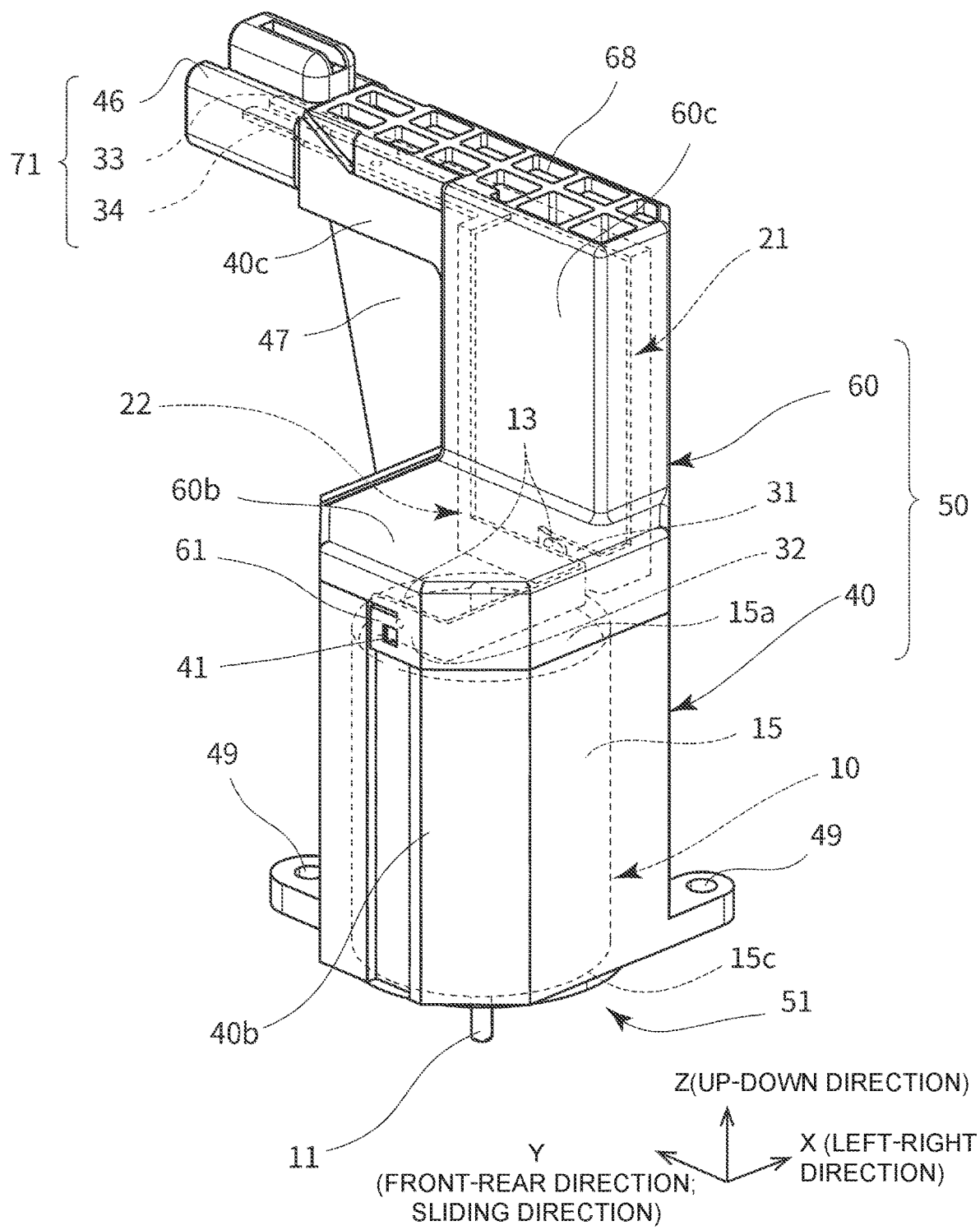
FIG. 1 A perspective view of a rotary apparatus according to one embodiment of the present invention as viewed from the upper left rear side.

In the present application, a direction along the rotary shaft of a motor is sometimes referred to as "axial direction," a direction perpendicular to the rotary shaft of the motor is sometimes referred to as "radial direction," and a direction along the arc about the rotary shaft of the motor is sometimes referred to as "circumferential direction." In addition, in the present application, the axial direction is defined as an up-down direction (the upper side in FIG. 1 is represented as "up"). Further, in the radial direction, a predetermined direction, in which a second housing is slid relative to a first housing as the second housing is attached to the first housing (hereinafter, referred to as "sliding direction"), is defined as a front-rear direction (a direction toward which an externally-connected terminal protrudes is represented as "front"). Based on the definitions of directions, the shape of each component and the positional relation between the components are described below. In the coordinates illustrated in the drawings, the axial direction corresponds to a Z-axis direction (the upward direction is defined as the positive direction of the Z-axis), and the front-rear direction corresponds to the Y-axis direction (the forward direction (the sliding direction) is defined as the positive direction of the Y-axis). In addition, the X-axis direction perpendicular to the Z-axis direction and perpendicular to the Y-axis direction is sometimes referred to as "left-right direction" (the rightward direction is defined as the positive direction of the X-axis). However, these directions including the front-rear direction, the up-down direction, and the left-right direction are defined solely for convenience of explanation. These directions are not intended to limit the directions in a device mounted with the rotary apparatus according to the present invention, or limit the orientation of this rotary apparatus at a time of use.

Embodiment

Figure 2:
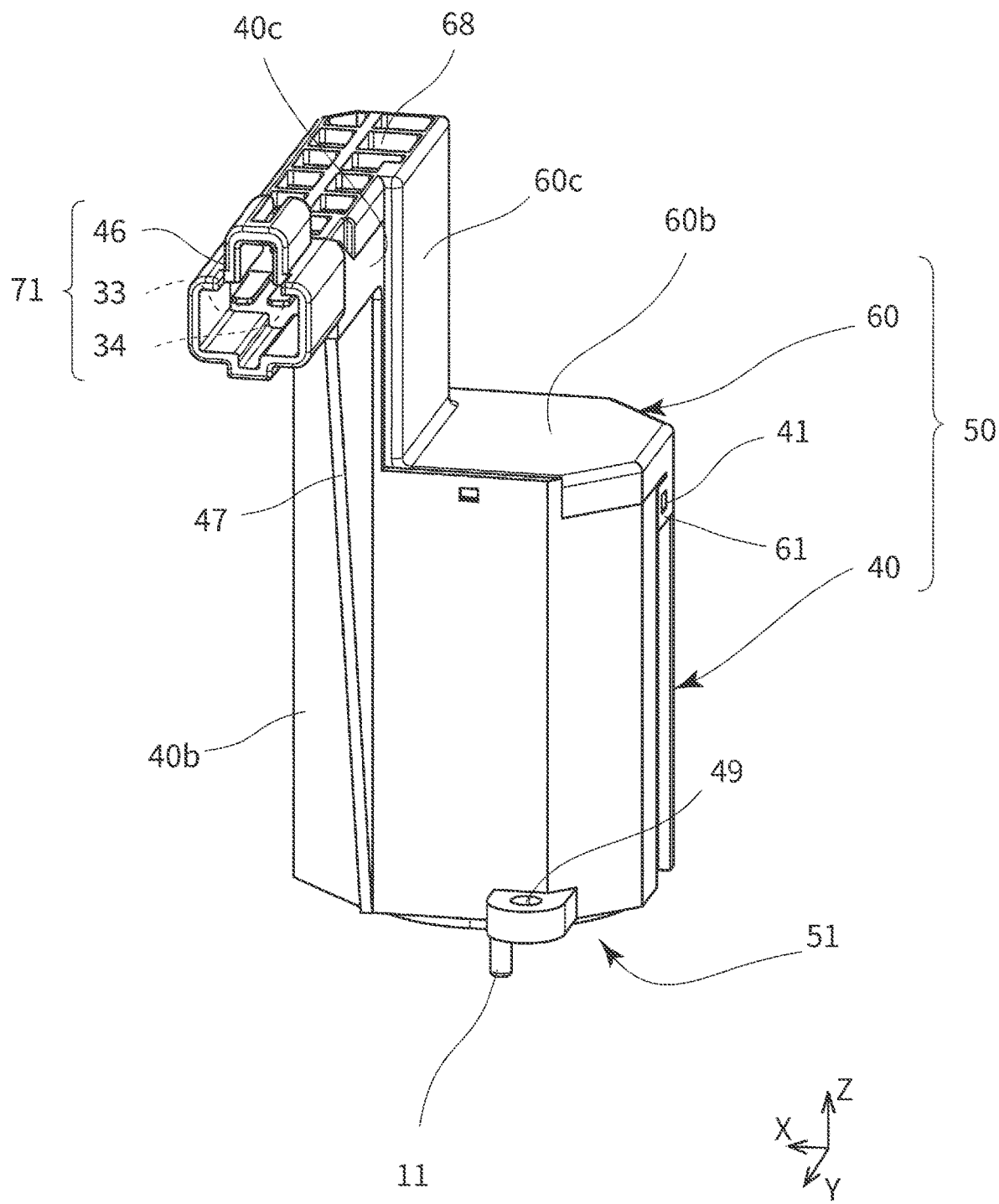
FIG. 2 A perspective view of the rotary apparatus as viewed from the upper front side.
Figure 3:
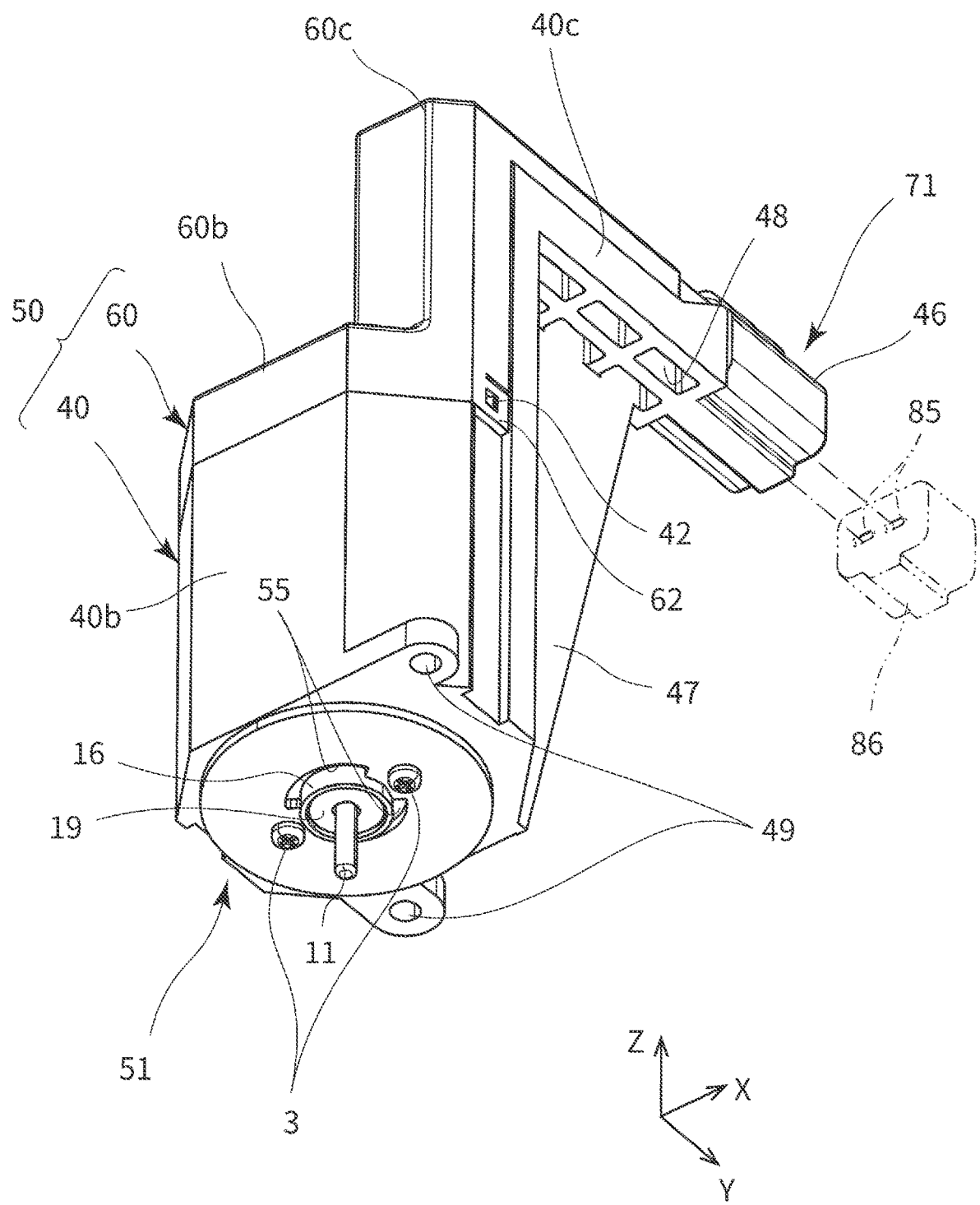
FIG. 3 A perspective view of the rotary apparatus as viewed from the lower rear side.
Figure 4:
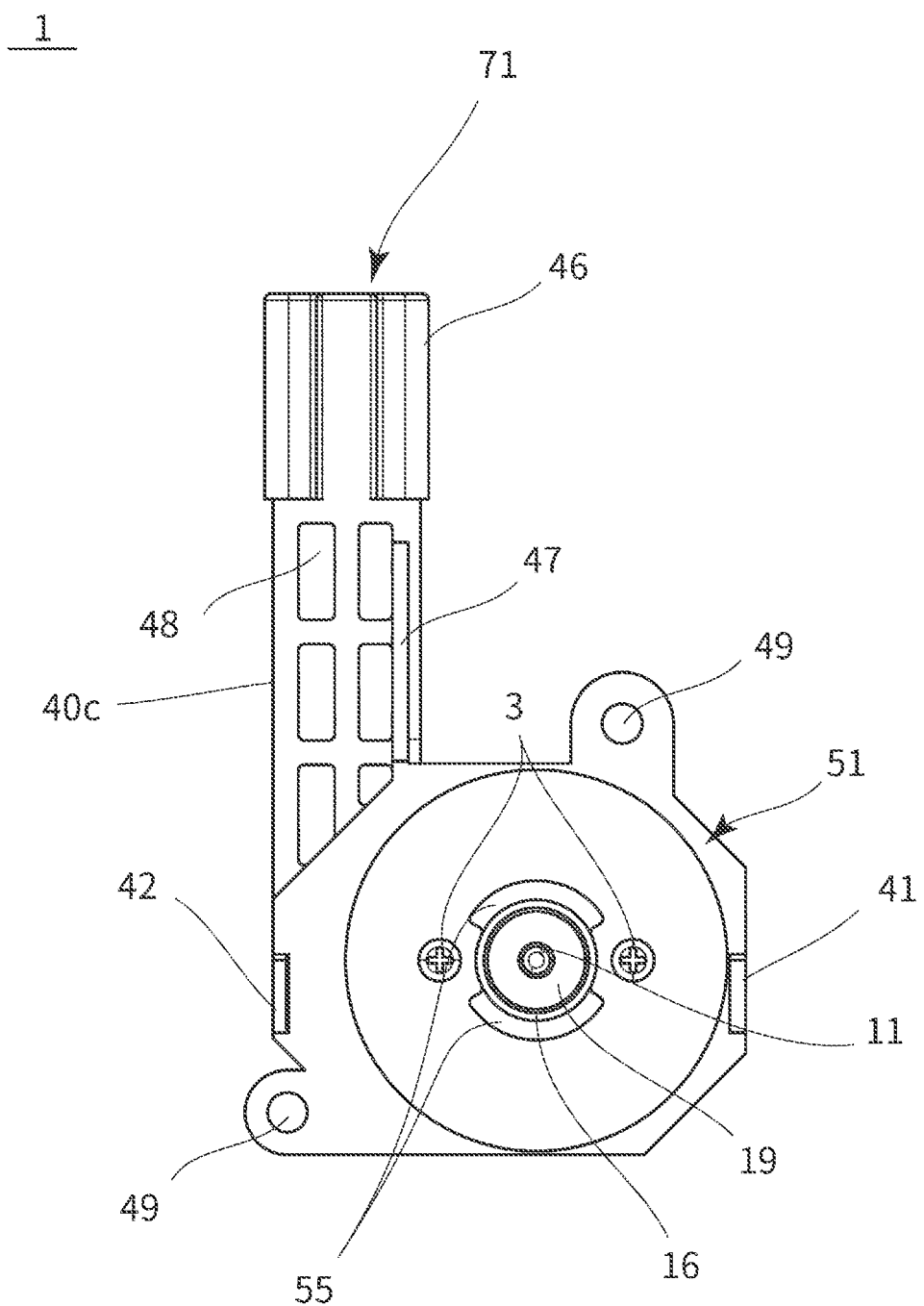
FIG. 4 A bottom view of the rotary apparatus.
Figure 5:
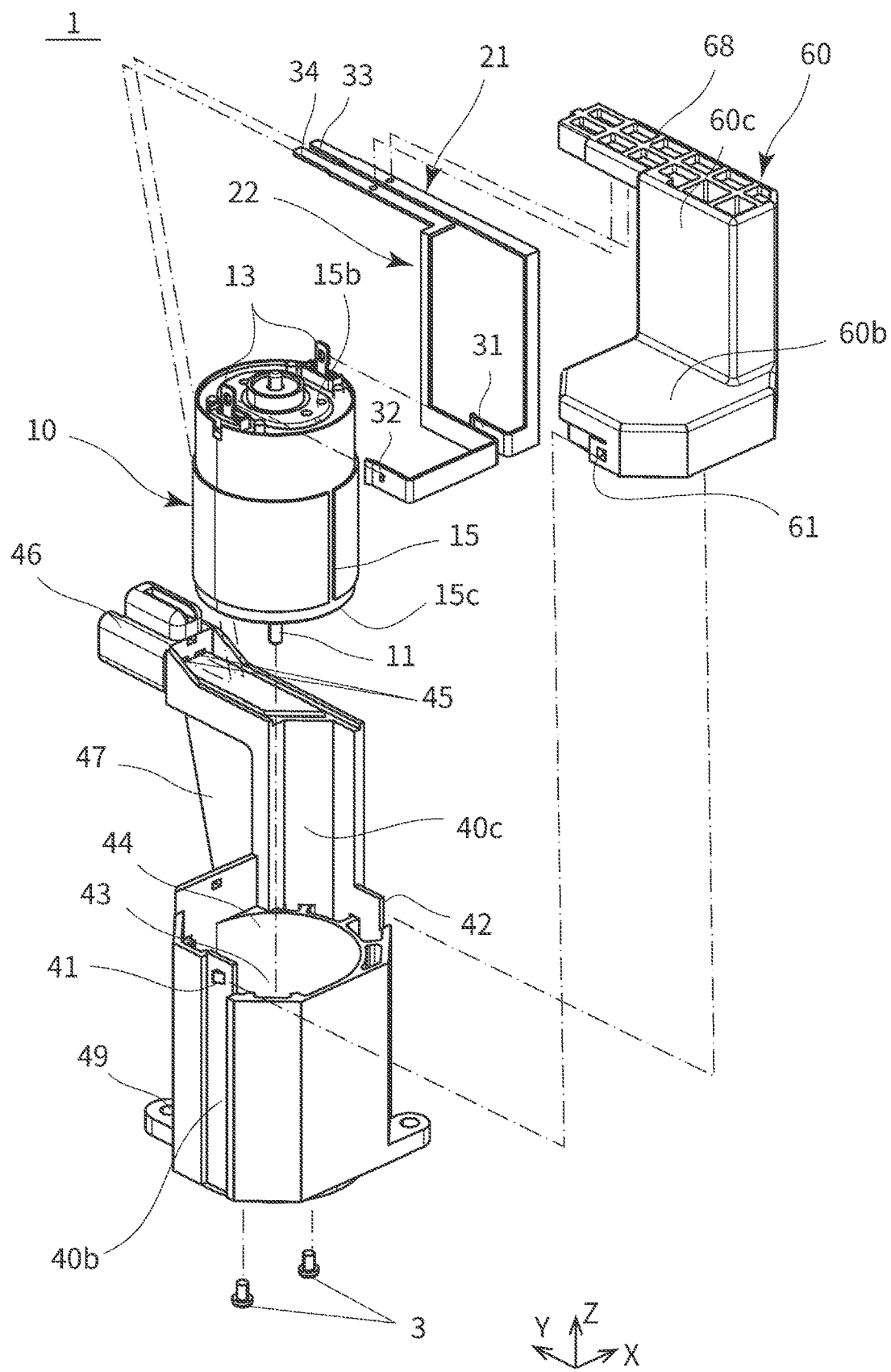
FIG. 5 An exploded perspective view of the rotary apparatus.

FIG. 1 is a perspective view of a rotary apparatus 1 according to one embodiment of the present invention as viewed from the upper left rear side. FIG. 2 is a perspective view of the rotary apparatus 1 as viewed from the upper front side. FIG. 3 is a perspective view of the rotary apparatus 1 as viewed from the lower rear side. FIG. 4 is a bottom view of the rotary apparatus 1. FIG. 5 is an exploded perspective view of the rotary apparatus 1.

The dotted lines partially illustrated in the drawings described below indicate hidden lines.

As illustrated in FIGS. 1 to 4, the rotary apparatus 1 has a structure that a motor is accommodated in a housing 50 formed of a second housing 40 and a first housing located at the upper side of the second housing 40. The rotary apparatus 1 includes two terminal members 21 and 22 (a first terminal member 21 and a second terminal member 22) and screws 3 in addition to the motor 10, the first housing 60, and the second housing 40.

As illustrated in FIG. 1, the motor 10 is located such that the rotation axis direction (the longitudinal direction of a rotary shaft 11) extends in the up-down direction. In other words, the rotation axis direction of the motor 10 is different from the sliding direction (the Y-axis direction; forward direction). The motor 10 includes a frame 15 having a substantially cylindrical shape. Two end portions of the motor 10 in the rotation axis direction are closed respectively by a bottom portion 15b defined as one end portion of the frame 15 and a top portion 15c defined as another end portion of the frame 15. The motor 10 is attached to the second housing 40 with the top portion 15c of the frame 15 oriented downward and the bottom portion 15b of the frame 15 oriented upward.

The motor 10 has a pair of motor terminals 13. The motor terminals 13 protrude from the bottom portion 15b of the frame 15 in the rotation axis direction. In other words, the motor terminals 13 protrude from the frame 15 of the motor 10 in the upward direction that is different from the sliding direction. Each of the motor terminals 13 is formed from, for example, a metal member such as a metal plate.

As illustrated in FIG. 3, the rotary shaft 11 is supported by a bearing 19 provided at the top portion 15c of the frame 15. The bearing 19 is held by a holding portion 16 formed at the top portion 15c of the frame 15. The holding portion 16 has an outer circumferential shape that is a cylindrical shape coaxial with the rotary shaft 11. The rotary shaft 11 protrudes from the top portion 15c of the frame 15 toward the outside of the frame 15.

In the present embodiment, the first housing 60 is a separate component from the second housing 40. The first housing 60 and the second housing 40 are made of resin. The first housing 60 and the second housing 40 are separately molded and attached to each other to be formed into a single housing 50 after molding. The first housing 60 is attached to the second housing 40 by sliding the first housing 60 in a predetermined sliding direction relative to the second housing 40. FIGS. 1 to 4 illustrate the first housing 60 in a state of being attached to the second housing 40. The first housing 60 can be separated from the second housing 40 by sliding the first housing 60 in a predetermined sliding direction relative to the second housing 40.

The second housing 40 has a body portion 40b to which the motor 10 is to be attached, and a lead-out portion 40c. The lead-out portion 40c extends upward from the body portion 40b and then extends forward. A connector housing portion 46 is provided at the front end portion (one end portion) of the lead-out portion 40c. At the lower portion of the body portion 40b, attaching hole portions (an example of the hole portion) 49 are provided and protrude from the surface of the body portion 40b in the radial direction.

Between the body portion 40b and the part of the lead-out portion 40c extending forward, a rib 47 is provided parallel to the rotary shaft of the motor 10 and parallel to the sliding direction (parallel to the Z-Y plane). This increases the strength of the lead-out portion 40c and also increases the rigidity of a part of the lead-out portion 40c. A plurality of recessed parts 48 are formed in a part of the lead-out portion 40c (for example, on the bottom side of the forward-extending part). The recessed parts 48 are formed and a rib is formed between the recessed parts 48, so that cost saving is achieved by reducing the weight and volume of the second housing 40, while relatively high rigidity of the lead-out portion 40c is maintained. Note that the rib 47 and the recessed parts 48 may not be provided.

The first housing 60 has a cover portion 60b and a terminal holding portion 60c. The cover portion 60b is formed to cover the upper portion of the body portion 40b. The terminal holding portion 60c is formed along the lead-out portion 40c. The terminal holding portion 60c extends upward from the cover portion 60b and then extends forward. The front end portion of the terminal holding portion 60c reaches the vicinity of the connector housing portion 46.

Recessed parts 68 are formed at a part of the terminal holding portion 60c (for example, on the upper side of the forward-extending part). The recessed parts 68 are formed and a rib is formed between the recessed parts 68, so that cost saving is achieved by reducing the weight and volume of the first housing 60, while relatively high rigidity of the terminal holding portion 60c is maintained. Note that the recessed parts 68 may not be provided.

The second housing 40 includes an attaching surface 51 at an end portion of the second housing 40 in the rotation axis direction. In other words, the attaching surface 51 is provided at the bottom surface of the housing 50. The rotary shaft 11 of the motor protrudes downward from the attaching surface 51. The end portion of the rotary shaft 11 protruding downward serves as an output end of the rotary apparatus 1.

As illustrated in FIG. 3, the attaching surface 51 is exposed at the bottom side of the second housing 40. The top portion 15c of the frame 15 of the motor 10 is attached to the attaching surface 51. Two screws 3 are located passing through the second housing from the lower side of the attaching surface 51 to be screwed into the top portion 15c of the frame 15 of the motor 10.

A hole 43b (illustrated in FIG. 7) is formed approximately at the center of the attaching surface 51, a hole 43b penetrates the second housing 40. The holding portion 16 along with the rotary shaft 11 are fitted into the hole 43b. A gap is formed in the radial direction between the outer circumferential surface of the holding portion 16 and a part of the hole 43b. This gap serves as fit portions 55.

As illustrated in FIG. 4, the fit portions 55 are formed at plural locations surrounding the holding portion 16. In the present embodiment, the fit portions 55 are formed at two locations that are symmetric to each other about the rotary shaft 11. The fit portions 55 as described above are formed at least at two locations around the holding portion 16, so that the outer circumferential surface of the holding portion 16 is exposed to the outside of the second housing 40 over the rotation axis direction. With this configuration, positioning of the rotary apparatus 1 can be facilitated by using the holding portion 16. Note that the fit portions 55 are not limited to this example, but may be formed into an annular shape such that the fit portion 55 surrounds the holding portion 16 over the entire circumference of the holding portion 16. The fit portions 55 may also be formed at, for example, three or more locations.

Figure 6:
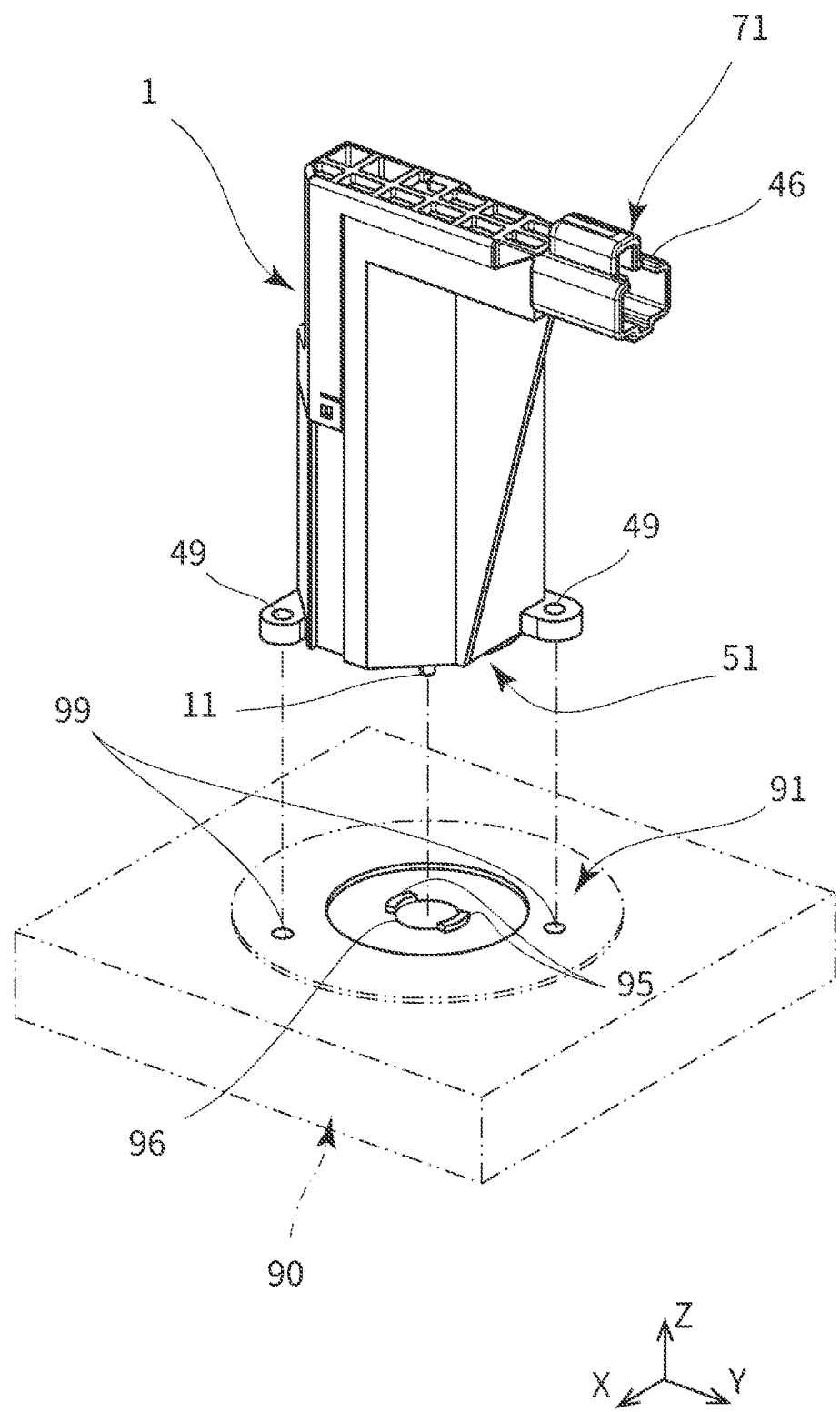
FIG. 6 An explanatory view illustrating an attaching structure of the rotary apparatus and an attached portion.

FIG. 6 is an explanatory view illustrating an attaching structure of the rotary apparatus 1 and an attached portion 90.

For example, in the rotary apparatus 1, a gear, a pulley, and other devices are attached to the lower end portion of the rotary shaft 11 of the motor 10. Then, the rotary apparatus 1 is attached to the attached portion 90 and can be used. The attached portion is a device to be driven by the rotary apparatus 1 serving as a driving source, or is a speed reducer configured to reduce the driving force of the rotary apparatus 1 and transmit the reduced driving force to another device, for example. However, the attached portion is not limited to this example. FIG. 6 omits illustrations of a specific device, but illustrates the attached portion 90 by the chain double-dashed lines.

As illustrated in FIG. 6, the attached portion 90 has an attaching surface 91 on the upper side of the attached portion 90. The rotary apparatus 1 is attached to the attaching surface 91. The attaching surface 91 is provided with protruding portions (an example of the fitted portion) 95 protruding upward, a fit hole (an example of the fitted portion) 96 recessed downward, and attaching hole portions 99.

The fit hole 96 has an outer circumferential shape slightly larger than the outer circumferential surface of the holding portion 16 of the motor 10. The protruding portions are located in the attaching surface 91 at the peripheral edge portion of the fit hole 96 to surround the fit hole 96. In the present embodiment, the protruding portions 95 are formed at two locations that are symmetric to each other about the center axis of the fit hole. Each of the protruding portions 95 has such a shape that the protruding portion 95 is capable of being fitted into the fit portion 55 (for example, a width in the radial direction, a width in the circumferential direction, and a height of the upward protrusion).

The rotary apparatus 1 is attached to the attached portion 90 such that the attaching surface 51 is opposed to the attaching surface 91 of the attached portion 90. At this time, by fitting the protruding portions 95 into the respective fit portions 55 (an example of the fit), the rotary apparatus 1 is positioned relative to the attached portion 90. The holding portion 16 is fitted into the fit hole 96 (an example of the fit), so that the rotary apparatus 1 is positioned relative to the attached portion 90. As the rotary apparatus 1 is in a state of being positioned in this manner, screws are located to pass through the attaching hole portions 49, and then screwed respectively into the attaching hole portions 99, so that the rotary apparatus 1 can be attached to the attached portion 90 (an example of the attaching structure of the rotary apparatus 1 to the attached portion 90). According to the attaching structure described above, the rotary apparatus 1 can be easily positioned relative to the attached portion 90, and can thus be attached to the attached portion 90.

Note that the configuration of the attaching surface 91 is not limited to this example. The attaching surface 91 may be provided with fitted portions having a different shape and capable of being fitted into the fit portions 55. The rotary apparatus 1 may be positioned by only using the holding portion 16 without providing the fit portions 55. The rotary apparatus 1 may be positioned without using the holding portion 16, and the positioning may be performed only by fitting the fitted portions into the fit portions 55.

As illustrated in FIG. 5, an accommodating part 43 is provided inside the body portion 40b of the second housing 40 and is configured to accommodate the motor 10. The accommodating part 43 has an opening portion 44 in the rotation axis direction of the motor 10. The opening portion 44 is provided at the upper end portion of the accommodating part 43. The accommodating part 43 forms a space in which the motor 10 can be accommodated. The space has a cylindrical shape and a height in the up-down direction. In a state in which the first housing 60 is attached to the second housing 40, the cover portion 60b of the first housing 60 closes the opening portion 44 of the accommodating part 43.

Figure 7:
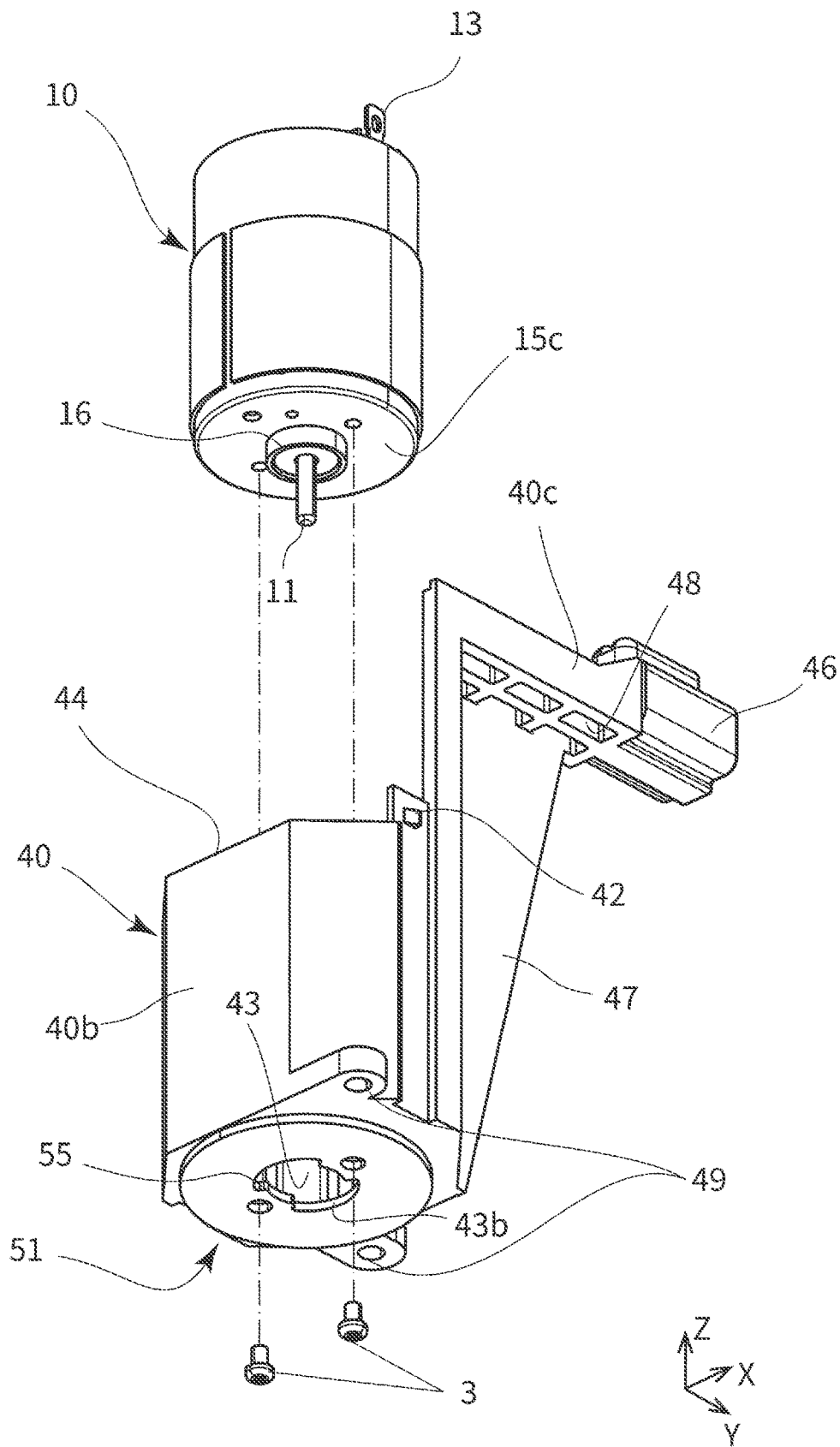
FIG. 7 An exploded perspective view illustrating an attaching structure of a motor to a second housing.
Figure 8:
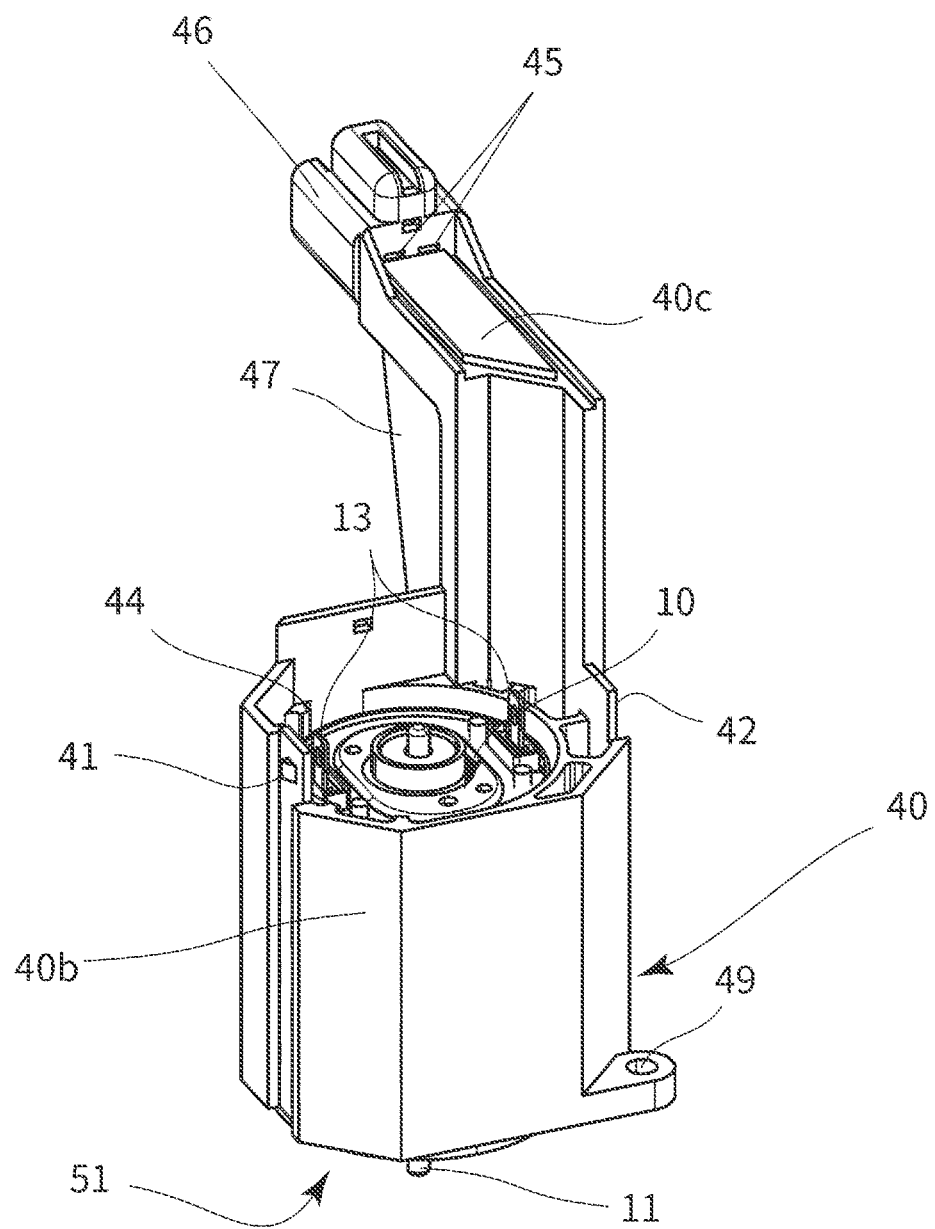
FIG. 8 A perspective view of the second housing with the motor attached to the second housing.

FIG. 7 is an exploded perspective view illustrating an attaching structure of the motor 10 to the second housing 40. FIG. 8 is a perspective view of the second housing 40 with the motor 10 attached to the motor 10.

As illustrated in FIG. 7, at the time of producing the rotary apparatus 1, the motor 10 can be accommodated in the accommodating part 43 by inserting the motor 10 from above the second housing 40 through the opening portion 44 into the accommodating part 43. The motor 10 is fixed to the inner side of the accommodating part 43 closer to the attaching surface 51 by the screws 3 screwed upward from the lower side of the attaching surface 51.

In this manner, the motor 10 is attached in the accommodating part 43 of the second housing 40. This brings the motor 10 into a state of being held in the second housing 40 as illustrated in FIG. 8. For example, the depth of the accommodating part 43 in the rotation axis direction is approximately equal to the length of the frame 15 of the motor 10 in the rotation axis direction. As the motor 10 in a state of being accommodated in the accommodating part 43 is viewed from the rear side, the pair of motor terminals 13 protrudes upward relative to the upper edge portion of the body portion 40b. In other words, each of the motor terminals 13 protrudes upward relative to the opening portion 44.

In the present embodiment, each of the motor terminals 13 has a plate-like shape with a surface parallel to the Y-Z plane. Each of the motor terminals 13 has a plate-like shape with surfaces extending parallel to each other in the sliding direction. In other words, the motor terminals 13 each have a plate-like shape and are parallel to each other, and the motor 10 is attached to the second housing 40 with each of the motor terminals 13 oriented parallel to the sliding direction. In the present embodiment, by properly setting positions at which the screws 3 screwed into the top portion 15c of the frame 15 pass through the second housing 40, the posture of the motor 10 in the circumferential direction relative to the second housing 40 is determined. Note that, for example, the frame 15 of the motor 10, and the accommodating part 43 may be formed into such shapes as to be positioned by each other in the circumferential direction (such as recessed and protruding shapes), and the posture of the motor 10 in the circumferential direction relative to the second housing 40 may be determined by such shapes. In either case, the position of the motor 10 in the circumferential direction relative to the second housing 40 can be easily determined.

Referring back to FIG. 1, the two terminal members 21 and 22 (the first terminal member 21 and the second terminal member 22) are attached to the first housing 60. In a state in which the first housing 60 is attached to the second housing 40, each of the terminal members 21 and 22 is located between the first housing 60 and the second housing 40. Each of the terminal members 21 and 22 is interposed between the first housing 60 and the second housing 40 in a state in which the first housing 60 is attached to the second housing 40.

In the present embodiment, in a state in which the first housing 60 is attached to the second housing 40, the major part of the motor 10 and the terminal members 21 and 22 is accommodated in the housing 50. In other words, the motor 10 and the terminal members 21 and 22 are covered by the first housing 60 and the second housing 40. A part of the rotary shaft 11 of the motor 10 and a part of the top portion 15c of the frame 15, as well as externally-connected terminal portions 33 and 34 (a first externally-connected terminal portion 33 and a second externally-connected terminal portion 34) are exposed to the outside of the housing 50.

Figure 9:
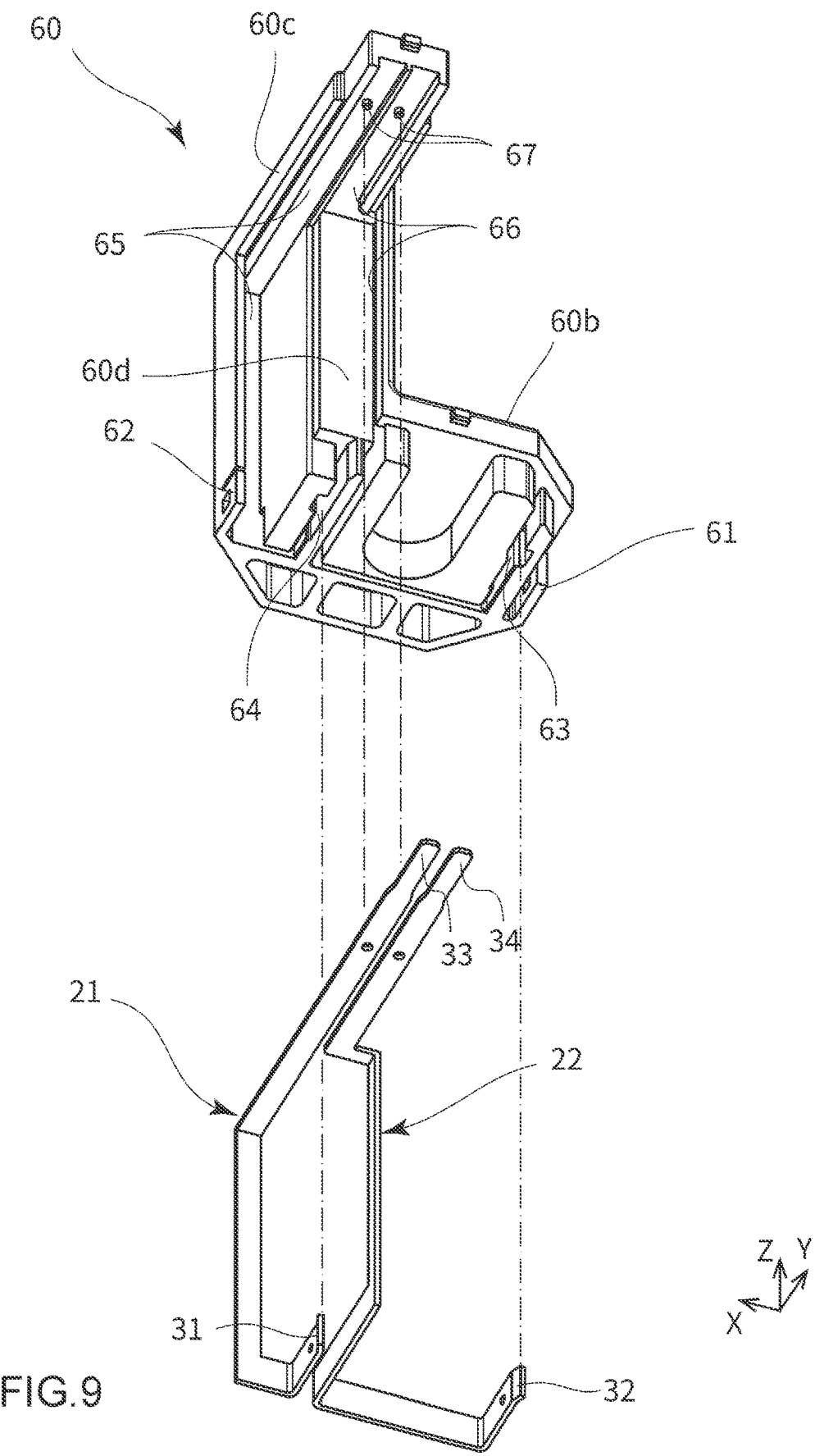
FIG. 9 An exploded perspective view illustrating an attaching structure of terminal members to a first housing.
Figure 10:
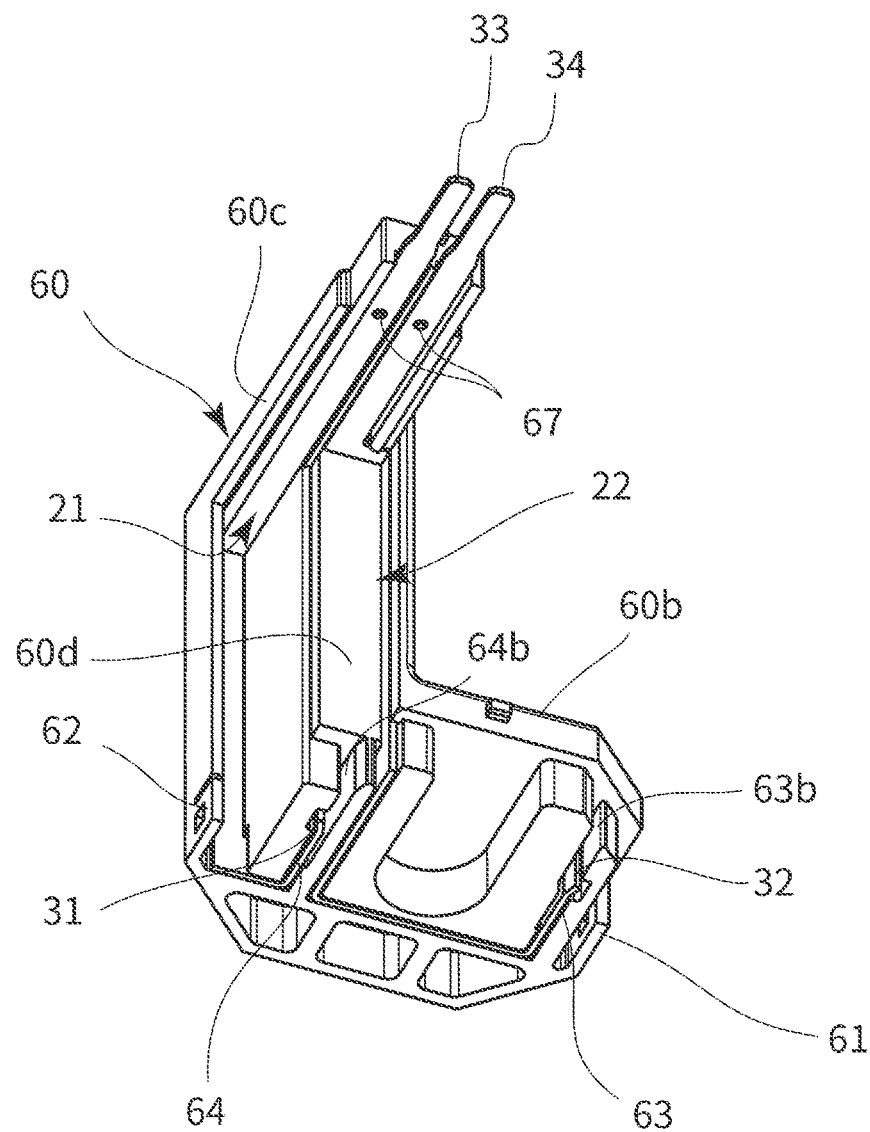
FIG. 10 A perspective view of the first housing with the terminal members attached to the first housing.

FIG. 9 is an exploded perspective view illustrating an attaching structure of the terminal members 21 and 22 to the first housing 60. FIG. 10 is a perspective view of the first housing 60 with the terminal members 21 and 22 attached to the first housing 60.

As illustrated in FIG. 9, the first terminal member 21 has a first motor-connected terminal portion 31 to be connected to one of the motor terminals 13 of the motor 10, and the first externally-connected terminal portion 33 to be connected to an external unit. The second terminal member 22 has a second motor-connected terminal portion 32 to be connected to another motor terminal 13 of the motor 10, and the second externally-connected terminal portion 34 to be connected to the external unit. In the present embodiment, the first terminal member 21 is located at the right side of the second terminal member 22.

In a state in which the first housing 60 is attached to the second housing 40, the motor-connected terminal portions 31 and 32 are connected respectively to the pair of motor terminals 13. In other words, in a state in which the first housing 60 is attached to the second housing 40, the terminal members 21 and 22 are electrically connected to the motor terminals 13.

The longitudinal direction of the externally-connected terminal portions 33 and 34 is the same direction in relation to the sliding direction. In other words, the externally-connected terminal portions 33 and 34 extend forward.

Each of the terminal members 21 and 22 is formed of a metal plate. The terminal members 21 and 22 each have a band shape that is bent multiple times from a section provided with the motor-connected terminal portions 31 and 32 to a section provided with the externally-connected terminal portions 33 and 34. The motor-connected terminal portions 31 and 32 are attached to a part at the bottom side in the cover portion 60b. The terminal members 21 and 22 are bent respectively from the motor-connected terminal portions 31 and 32 along the terminal holding portion 60c, then extend upward, and extend forward to connect to the externally-connected terminal portions 33 and 34.

Note that each of the terminal members 21 and 22 may be formed of a plurality of metallic materials that are coupled with each other to be electrically connected. For example, the motor-connected terminal portion 31 and the externally-connected terminal portion 33 may be formed of separate portions such that these separate portions are electrically connected by a metal plate, a conductive wire, or the like. In the present embodiment, since each of the two pole terminals is formed from a single metal plate into one piece, the number of components can be reduced and accordingly the production costs can be reduced. In addition, improper contact or other problems is prevented from occurring from the motor-connected terminal portions 31 and 32 to the externally-connected terminal portions 33 and 34. This can increase the reliability of the rotary apparatus 1.

Inside the first housing 60 (at the bottom-side section opposed to the second housing 40 and at the front-side section), groove portions 63 and 64 and terminal guide portions 65 and 66 are provided. Each of the groove portions 63 and 64 has a shape recessed upward from the bottom side of the cover portion 60b, and has a part formed along the sliding direction. The groove portion 64 is formed corresponding to the first terminal member 21. The first motor-connected terminal portion 31 is fitted into the part of the groove portion 64 formed along the sliding direction. The groove portion 63 is formed corresponding to the second terminal member 22. The second motor-connected terminal portion 32 is fitted into the part of the groove portion 63 formed along the sliding direction. In other words, the motor-connected terminal portions 31 and 32 are positioned inside the groove portions 63 and 64, respectively. The motor terminals 13 and 13 contact the motor-connected terminal members 31 and 32 inside the groove portions 63 and 64.

The groove portions 63 and 64 are provided and spaced apart from each other with a spacing nearly equal to the spacing between the pair of motor terminals 13. Each of the groove portions 63 and 64 is open toward the sliding direction. The groove portions 63 and 64 are formed with leading portions 63b and 64b near the respective end portions of the groove portions 63 and 64 in the sliding direction. The leading portions 63b and 64b are slightly wider in the left-right direction. As described later, as the first housing 60 is slid relative to the second housing 40 and attached to the second housing 40, the motor terminals 13 pass through the leading portions 63b and 64b and are easily guided to the groove portions 63 and 64. Thus, the rotary apparatus 1 can be easily produced.

Guide portions (hereinafter, referred to as "terminal guide portions") 65 and 66 are provided at the inner side of the terminal holding portion 60c corresponding to the terminal members 21 and 22, respectively. The terminal guide portion 65 corresponding to the first terminal member 21 has a width slightly greater than the width of the first terminal member 21. The terminal guide portion 65 has a relatively wide groove-like shape that is recessed rearward or upward from the other section. The terminal guide portion 66 corresponding to the second terminal member 22 has a width slightly greater than the width of the second terminal member 22. The terminal guide portion 65 has a relatively wide groove-like shape that is recessed leftward or upward from the other section. The terminal members 21 and 22 are located at the inner side of the first housing along the terminal guide portions 65 and 66, respectively. As illustrated in FIG. 10, even in the section of the terminal members 21 and 22 extending forward adjacent to each other in the left-right direction, the section between the terminal guide portion 65 and the terminal guide portion 66 serves as a wall part to partition the first terminal member 21 and the second terminal member 22 from each other. This prevents the first terminal member 21 and the second terminal member 22 from contacting each other, and thus can prevent the occurrence of a short circuit.

Note that in the present embodiment, the first terminal member 21 and the second terminal member 22 are located away from each other through a wall part 60d in a portion at the inner side of the terminal holding portion 60c extending upward from the cover portion 60b. Therefore, this ensures that the occurrence of a short circuit is prevented even in environments with vibration or other factors which can cause deflection of the terminal members 21 and 22.

Each of the terminal guide portions 65 and 66 is formed with a protrusion (hereinafter, referred to as "protrusion for welding") 67. In the present embodiment, the protrusion for welding 67 is formed in such a manner as to protrude downward from the bottom surface of the section of the terminal holding portion 60c extending forward. The protrusion for welding 67 passes through a hole portion formed in each of the terminal members 21 and 22. In a state in which the terminal members 21 and 22 are located in the terminal guide portions 65 and 66 such that the protrusion for welding 67 passes through the hole portion of each of the terminal members 21 and 22, and the motor-connected terminal portions 31 and 32 are respectively fitted into the groove portions 63 and 64, then the tip end portion of the protrusion for welding 67 is heated and is deformed by the heating, so that the terminal members 21 and 22 can be fixed to the first housing 60.

Referring back to FIG. 8, in the present embodiment, the connector housing portion 46 of the second housing 40 is provided with a hole portion (hereinafter, referred to as "terminal hole portion") 45 penetrating from the front of the connector housing portion 46 to the lead-out portion 40c. The terminal hole portion 45 includes two through holes. the externally-connected terminal portions 33 and 34 can be inserted into the terminal hole portion 45 in the sliding direction.

As illustrated in FIG. 2, in a state in which the first housing 60 is attached to the second housing 40, the externally-connected terminal portions 33 and 34 passing through the terminal hole portion 45 in the sliding direction from the lead-out portion 40c are located in the connector housing portion 46. A connector portion 71 is formed with the connector housing portion 46 and the externally-connected terminal portions 33 and 34.

As illustrated in FIG. 3, an external connector 86 is capable of connecting to the connector portion 71. The external connector 86 has connector terminals 85 serving as a female terminal, and a housing configured to hold the connector terminals 85. The external connector housing portion 46 is connected to the housing of the external connector 86. As the external connector 86 is connected to the connector portion 71, the connector terminals 85 of the external connector 86 are connected to the externally-connected terminal portions 33 and 34 of the connector portion 71. With this connection, a current can pass from the external connector 86 to the motor 10 via the terminal members 21 and 22.

Figure 11:
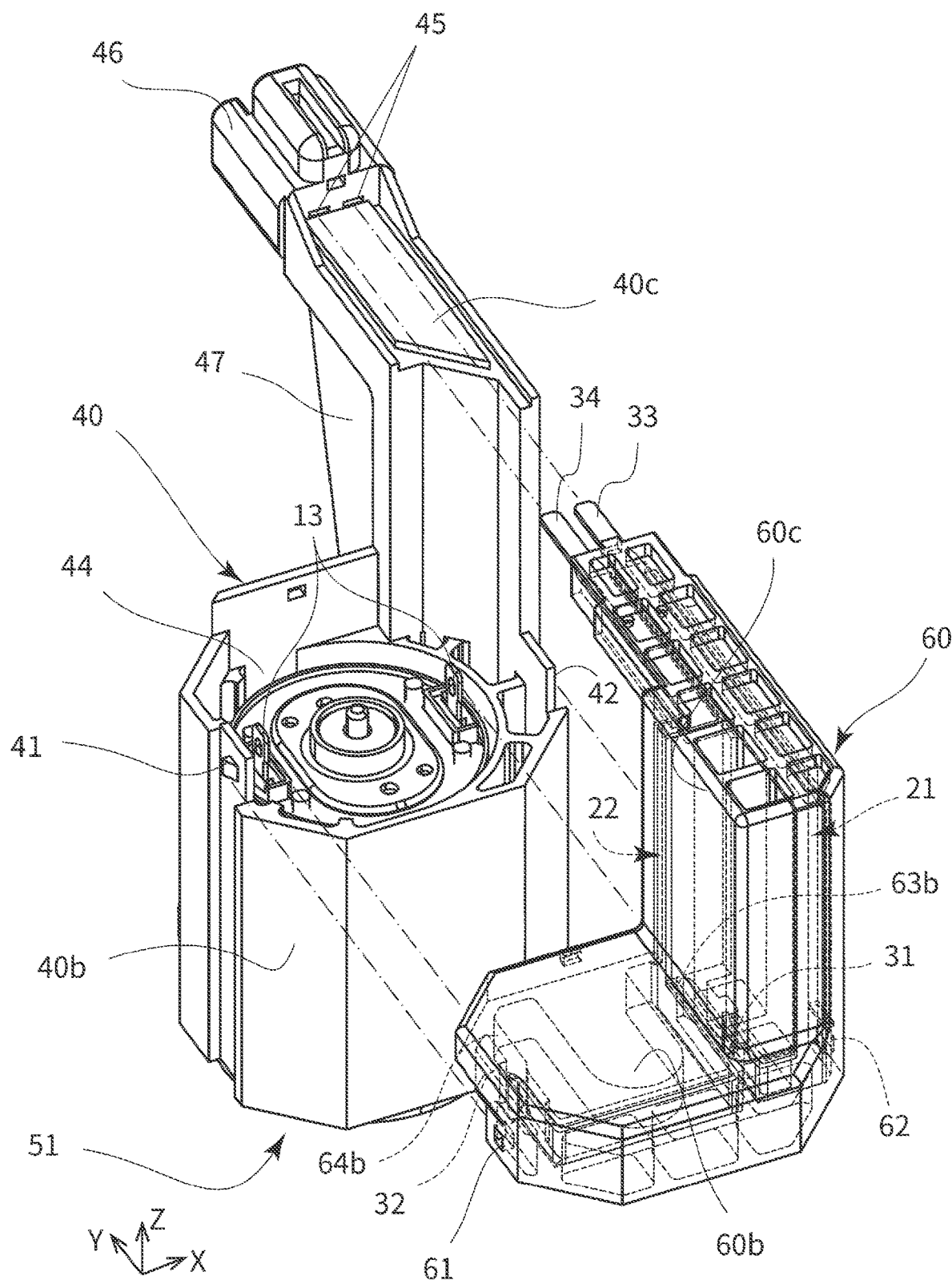
FIG. 11 A perspective view illustrating an attaching structure of the first housing and the second housing.
Figure 12:
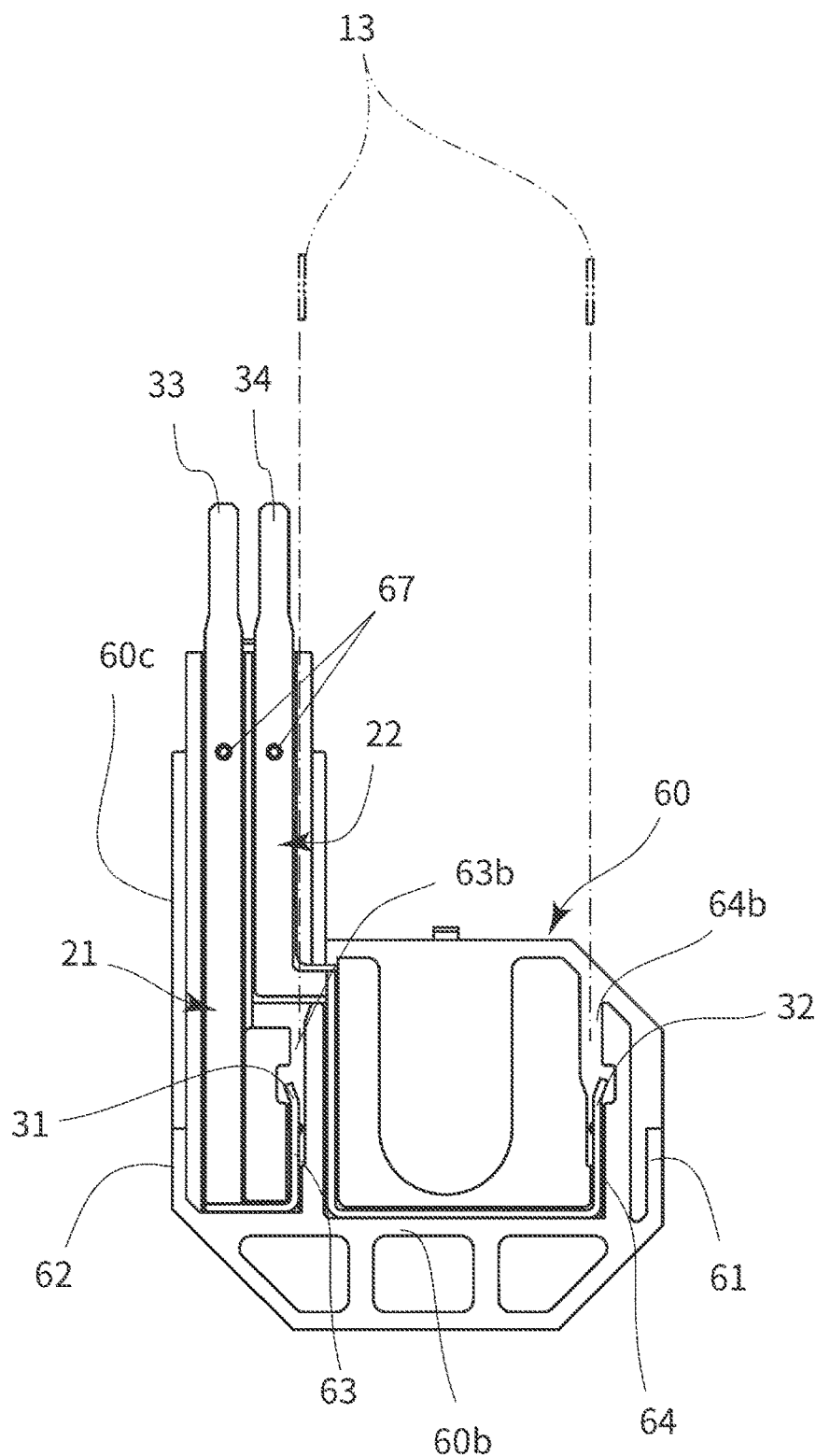
FIG. 12 A bottom view illustrating connection of motor terminals and motor-connected terminal portions.
Figure 12:
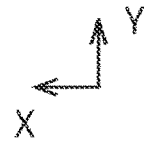

FIG. 11 is a perspective view illustrating an attaching structure of the first housing 60 and the second housing 40. FIG. 12 is a bottom view illustrating connection of the motor terminals 13 and the motor-connected terminal portions 31 and 32.

In the present embodiment, in a state in which the motor 10 is attached to the second housing 40, and the terminal members 21 and 22 are attached to the first housing as described above, the rotary apparatus 1 is assembled by attaching the first housing to the second housing 40. It is possible to bring the first housing 60 into a state of being attached to the second housing 40 by sliding the first housing 60 in the sliding direction relative to the second housing 40. The first housing 60 is fitted into the second housing 40 and attached to the second housing 40.

In the second housing 40, a protrusion 41 is formed at the left upper portion of the body portion 40b and protrudes from the outer circumferential surface of the body portion 40b. In addition, a protrusion 42 is formed at the right upper portion of the body portion 40b and protrudes from the outer circumferential surface of the body portion 40b (illustrated in FIG. 7, for example). Corresponding to the protrusions 41 and 42, fitting pieces 61 and 62 are formed respectively at the outer circumferential surface of the cover portion 60b in the first housing 60. Each of the fitting pieces 61 and 62 has a tongue-like shape supported at the rear side by the cover portion 60b and having flexibility in the left-right direction. The fitting pieces 61 and 62 have respective holes engageable with the protrusions 41 and 42. The protrusions 41 and 42 are engaged with (fitted into) the fitting pieces 61 and 62 respectively in a snap-fit manner. In other words, the protrusion 41 is engaged with the fitting piece 61 while the protrusion 42 is engaged with the fitting piece 62 by sliding the first housing 60 in the sliding direction relative to the second housing 40. With this engagement, the first housing 60 is fitted into the second housing 40.

As the first housing 60 is slid relative to the second housing 40 in this manner, the pair of motor terminals 13 is inserted respectively from the leading portions 63b and 64b into the inside of the groove portions 63 and 64, as illustrated in FIG. 12. The motor terminals 13 slide through the inside of the groove portions 63 and 64 in the sliding direction, and contact the motor-connected terminal portions 31 and 32 inside the groove portions 63 and 64. In a state in which the motor terminals 13 contact the motor-connected terminal members 31 and 32, the first housing 60 is fitted into the second housing 40 and is fixed to the second housing 40. The motor terminals 13 and the motor-connected terminal portions 31 and 32 are in a state of being slightly elastically deformed inside the groove portions 63 and 64. This ensures that the motor terminals 13 and the motor-connected terminal members 31 and 32 maintain an electrically connected state.

As illustrated in FIG. 11, as the first housing 60 is brought into a state of being attached to the second housing 40 by sliding the first housing 60 relative to the second housing 40, the externally-connected terminal portions 33 and 34 pass through the terminal hole portion 45. Then, as the externally-connected terminal portions 33 and 34 are brought into a state of being connectable to the connector terminals 85 of the external connector 86 to be connected to the connector portion 71, the first housing 60 is fitted into the second housing 40 and is fixed to the second housing 40.

As described above, in the present embodiment, it is possible to facilitate assembly of the rotary apparatus 1, including accommodating the motor 10 by sliding the first housing 60 relative to the second housing 40. The rotary apparatus 1 has the connector portion 71 connected to the motor terminals 13 of the motor 10. Therefore, it is unnecessary to perform an additional step of connecting a connector or other devices to the motor terminals 13 separately from the step of accommodating the motor 10 in the housing. Thus, the rotary apparatus 1 installed with the connector portion 71 can be more easily produced.

The externally-connected terminal portions 33 and 34 are held by the first housing 60. The connector housing portion 46 is provided at the second housing 40 to be attached to the attached portion 90. Accordingly, even if a force is applied to the connector housing portion 46 by attachment/detachment of the external connector 86 to/from the connector portion 71, the application of the force does not significantly affect the fit between the first housing 60 and the second housing 40. Therefore, the reliability of the rotary apparatus 1 can be increased. The connector housing portion 46 is supported by the rib 47 at the body portion 40b and other portions, and thus has high rigidity. Consequently, this can increase the reliability of the rotary apparatus 1, and can also facilitate attachment/detachment of the external connector 86.

In the present embodiment, the rotation axis direction of the motor 10 is different from the sliding direction. Therefore, this can ensure reliable contact of the motor terminals 13 with the motor-connected terminal portions 31 and 32, even though the motor terminals 13 are small-sized. The positional relation between the individual sections can be determined such that, for example, even if the length of the motor terminals 13 in the rotation axis direction is relatively short, the motor terminals 13 are still located at a position to contact the motor-connected terminal portions 31 and 32, and such that the first housing 60 is fitted into the second housing 40.

The hole 43b is formed in the attaching surface 51, so that the outer circumferential surface of the holding portion 16 is exposed to the outside of the second housing 40 over the rotation axis direction at plural locations in the circumferential direction surrounding the holding portion 16. With this configuration, positioning of the rotary apparatus 1 can be facilitated by using the holding portion 16.

[Others]

The present invention is not limited to the configuration according to the above embodiment itself, and the constituent components according to the above embodiment may be appropriately combined to configure the embodiment. In the above embodiment, some of the constituent components, some of the characteristics, and the like may be omitted.

The shapes of the first housing, the second housing, the terminal members, the motor, and other components are not limited to those described above, and may be appropriately set.

The motor terminals may not protrude from the frame. For example,
The terminal part may be provided on the terminal member side of the frame and extends to the motor terminal and contact with the motor terminal. Also, the terminal part may be provided on the terminal member side of the frame to be inserted in the sliding direction into a motor having the female terminal.

The first housing can be separated from the second housing 40 by disengaging the protrusion from the fit piece (removing the protrusion fitting into the fit piece) and then sliding the first housing in a predetermined sliding direction.

In the above embodiment, the first housing 60 is attached to the second housing 40 by fitting the first housing 60 into the second housing 40 to prevent the first housing 60 from sliding in the sliding direction. However, the present invention is not limited to this example. The first housing may be attached to the second housing by using a jointing member such as an adhesive or using a fastening member such as a screw. It is also allowable that the first housing is attached to the second housing by fitting the first housing 60 into the second housing 40, and further by using the jointing member or the fastening member. Note that if the first housing is attached to the second housing by using the jointing member or the fastening member, it is allowable to slide the first housing in a predetermined direction relative to the second housing 40 to separate the first housing from the second housing 40 by removing the jointing member or removing the fastening member to bring the first housing into a state of being slidable in the predetermined sliding direction relative to the second housing. It is allowable to slide the first housing in the predetermined sliding direction to detach the first housing from the second housing 40.

The above embodiment should be considered as illustrative in all respects and not restrictive. The scope of the present invention is indicated not by the above descriptions, but by the claims, and is intended to include meanings equivalent to the claims and all modifications within the scope of the claims.

LIST OF REFERENCE SIGNS 1 rotary apparatus,
10 motor,
11 rotary shaft,
13 motor terminal,
15 frame,
21 first terminal member,
22 second terminal member, 31 first motor-connected terminal portion,
32 second motor-connected terminal member,
33 first externally-connected terminal portion,
34 second externally-connected terminal portion,
40 second housing,
41, 42 protrusion,
43 accommodating part,
44 opening portion,
45 terminal hole portion,
46 connector housing portion,
51 attaching surface,
55 fit portion,
60 first housing,
61, 62 fitting piece,
63, 64 groove portion,
71 connector portion,
85 connector terminal,
86 external connector,
90 attached portion,
91 attaching surface of attached portion,
95 protruding portion (example of fitted portion),
96 fit hole (example of fitted portion)

The invention claimed is:

1. A rotary apparatus comprising:
a motor including a motor terminal, a frame, and a bearing held by the frame;
a terminal member;
a first housing, the terminal member being attached to the first housing;
a second housing including an accommodating part configured to accommodate the frame of the motor, the first housing being attached to the second housing; and
a connector portion, wherein
the first housing is attachable to or separable from the second housing in a predetermined direction,
the motor is covered by the first housing and the second housing,
the terminal member contacts the motor terminal,
the terminal member includes an externally-connected terminal portion to be connected to an external unit, and
a longitudinal direction of the terminal member is different from a rotation axis direction of the motor,
the connector portion including
the externally-connected terminal portion, and
a connector housing portion being provided at the second housing,
the connector housing portion including a hole portion, the externally-connected terminal portion being insertable into the hole portion in the predetermined direction.

2. The rotary apparatus according to claim 1, wherein
the accommodating part includes an opening portion in the rotation axis direction of the motor, and
the first housing closes the opening portion.

3. The rotary apparatus according to claim 1, wherein
the motor terminal protrudes from the frame of the motor in a direction different from the predetermined direction.

4. The rotary apparatus according to claim 3, wherein
the first housing includes a groove portion formed in the predetermined direction,
the terminal member includes a motor-connected terminal portion positioned inside the groove portion, and
the motor terminal contacts the motor-connected terminal portion inside the groove portion.

5. The rotary apparatus according to claim 3, wherein the motor terminal includes a surface extending in the predetermined direction.

6. The rotary apparatus according to claim 1, wherein the first housing is fitted into the second housing.

7. The rotary apparatus according to claim 1, wherein
an end portion of the second housing includes an attaching surface in the rotation axis direction of the motor, and
the attaching surface includes a fit portion capable of fitting into an attached portion.

8. An attaching structure of a rotary apparatus, comprising:
the rotary apparatus according to claim 7; and
the attached portion attached to the attaching surface of the rotary apparatus,
wherein the fit portion of the rotary apparatus fits into a fitted portion formed in the attached portion.

9. A connecting structure of the rotary apparatus according to claim 1 and an external connector, wherein the external connector is connected to the connector portion.

* * * * *